No. 859,671. PATENTED JULY 9, 1907.
G. L. LANGER.
RAISIN SEEDING MACHINE.
APPLICATION FILED AUG. 14, 1905.

4 SHEETS—SHEET 3.

Witnesses.
T. Castberg.
B. Hawse

Inventor:
Gotthold L. Langer
By Geo. H. Strong atty.

No. 859,671. PATENTED JULY 9, 1907.
G. L. LANGER.
RAISIN SEEDING MACHINE.
APPLICATION FILED AUG. 14, 1905.
4 SHEETS—SHEET 4.
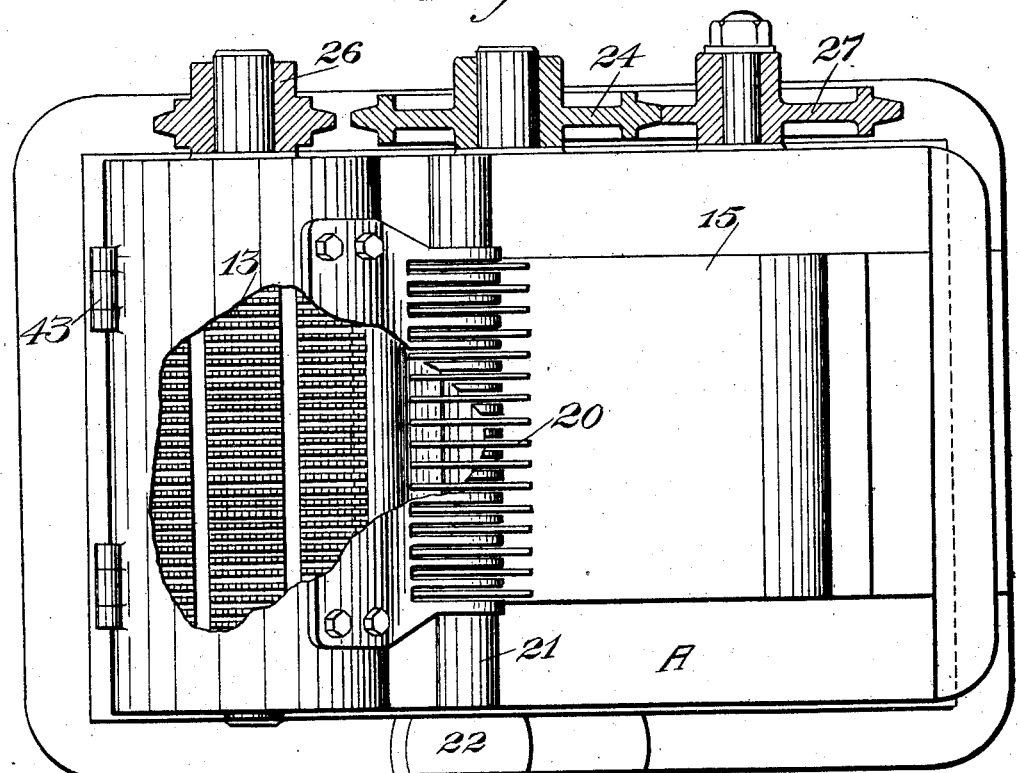
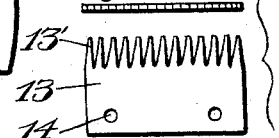
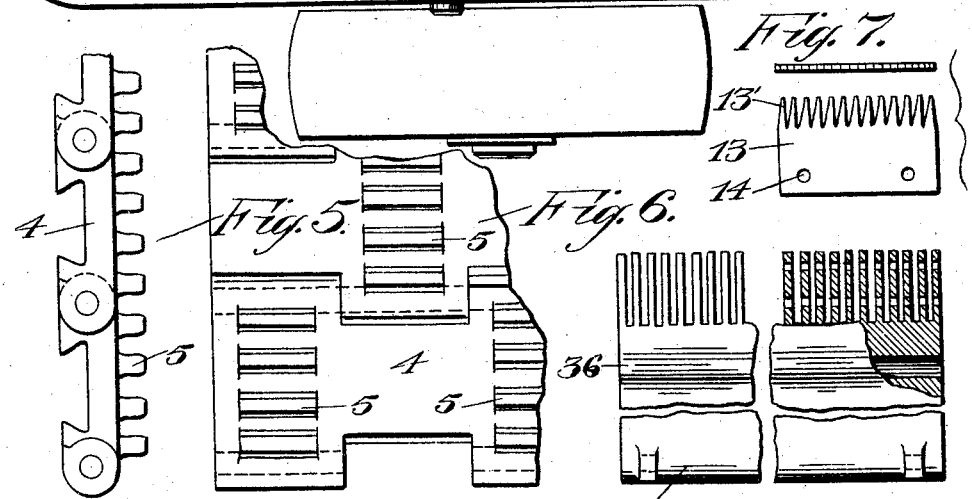
Witnesses. Inventor.

UNITED STATES PATENT OFFICE.

GOTTHOLD L. LANGER, OF SELMA, CALIFORNIA, ASSIGNOR TO CHARLES L. BELTZ, OF SELMA, CALIFORNIA.

RAISIN-SEEDING MACHINE.

No. 859,671.   Specification of Letters Patent.   Patented July 9, 1907.

Application filed August 14, 1905. Serial No. 274,180.

*To all whom it may concern:*

Be it known that I, GOTTHOLD L. LANGER, a citizen of the United States, residing at Selma, in the county of Fresno and State of California, have invented new and useful Improvements in Raisin-Seeding Machines, of which the following is a specification.

My invention relates to fruit seeding machines, and especially to machines for removing the seeds of raisins and the like.

The purpose of my invention is to provide a simple, practical machine of large capacity in which an endless carrier is employed having impaling teeth or points, a counter-surface of resilient material co-acting with the teeth to impale the fruit and expel the seeds; together with suitable associated stripping and cleaning mechanisms for removing and delivering the seeds separate from the pulp, and abrading means for keeping the teeth dull; and in which machine the impaling is done between two vertically arranged plane surfaces as distinguished from the cylinders usually employed. I purpose also a machine with an endless impaling carrier of the link type with teeth made in removable sections so that repairs, renewals or changes can easily and quickly be made.

The invention consists of the parts and the construction and the combination of parts as hereinafter more fully described and claimed, having reference to the accompanying drawings, in which—

Figure 1:
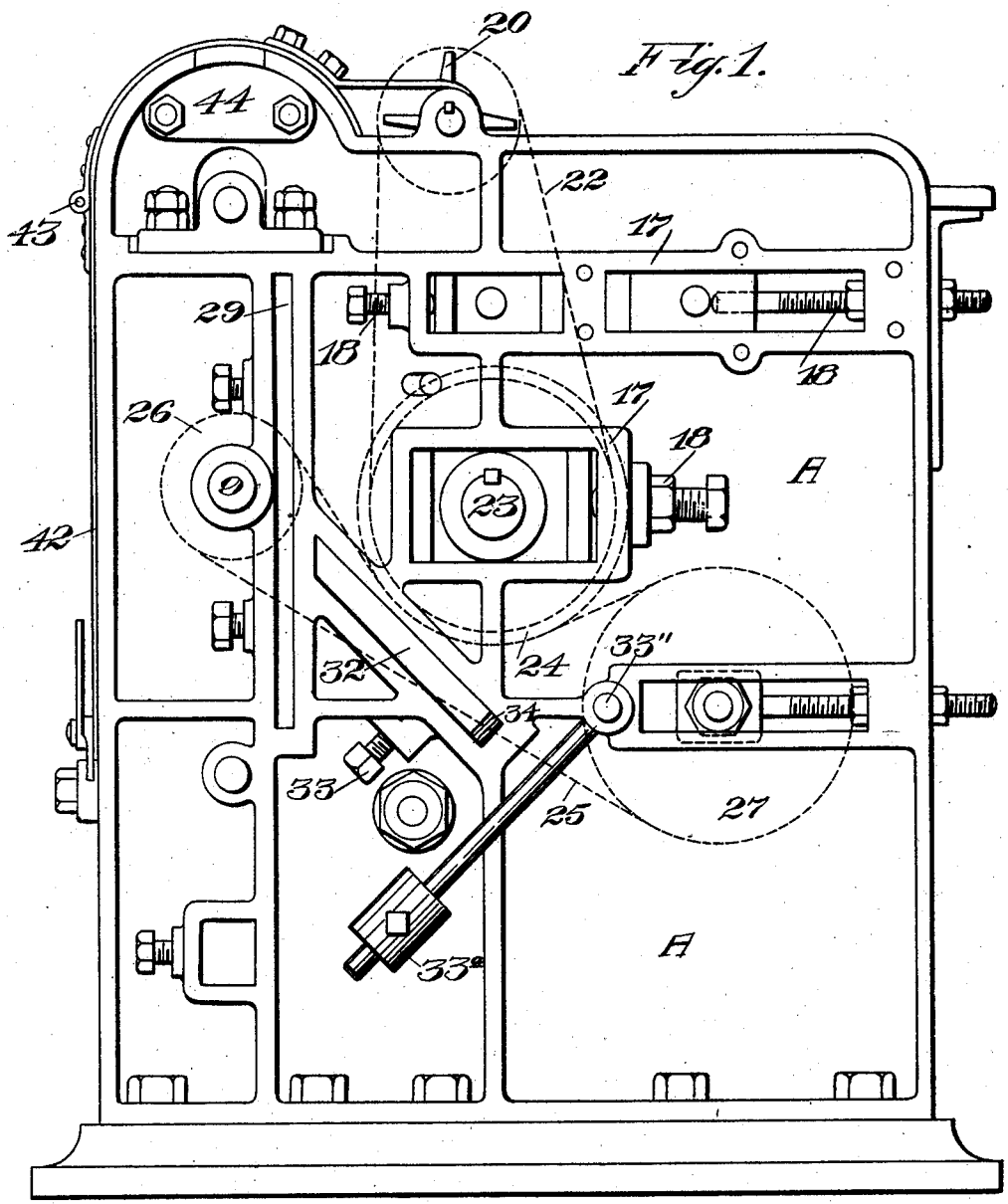
Figure 2:
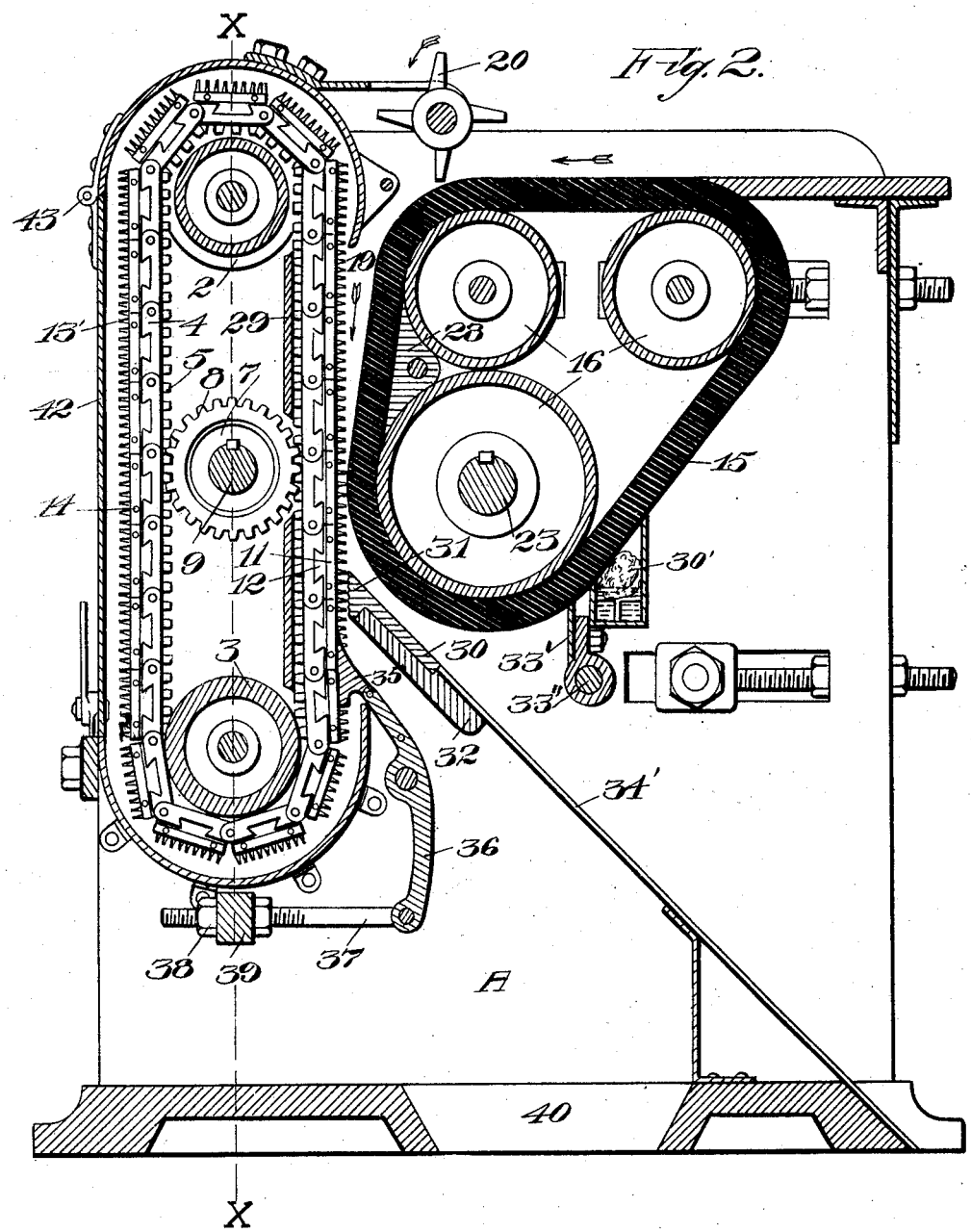
Figure 3:
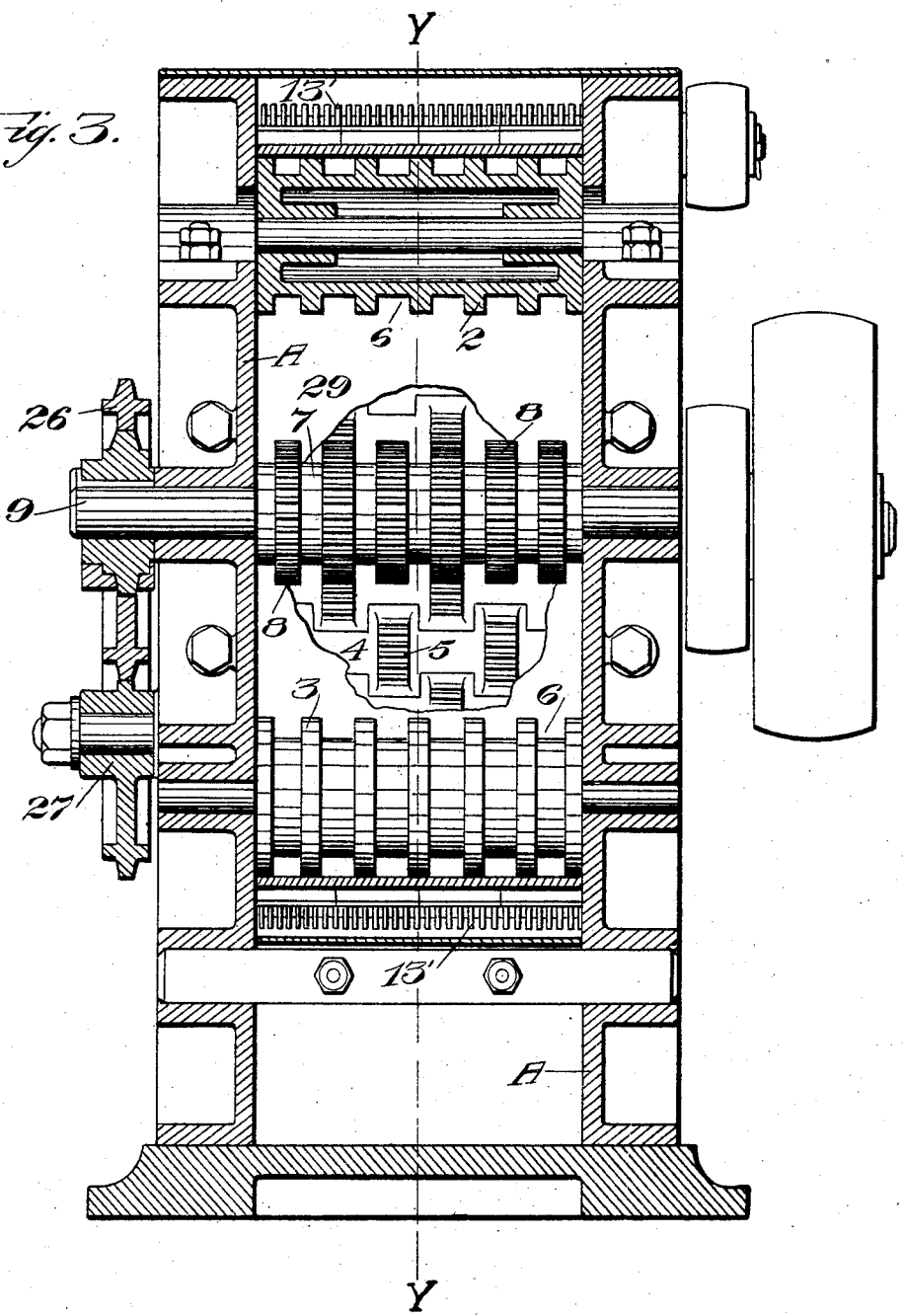

Figure 1 is a side elevation of my machine. Fig. 2 is a similar view in section on line Y—Y Fig. 3. Fig. 3 is a transverse section on line X—X Fig. 2 with part of presser-plate broken away. Fig. 4 is a plan view with part of top of casing broken away. Fig. 5 is a side view of a link. Fig. 6 is a plan of the links viewed from the rack side. Fig. 7 is a detail of a section carrying the impaling teeth. Fig. 8 is a detail of the carrier for the pulp strippers.

A represents the frame of my machine. Suitably journaled in the frame are the top and bottom grooved rollers 2—3, around which the endless impaling and seeding belt or apron travels in vertical planes. This belt or apron is of peculiar construction and comprises a plurality of conjoined links or slats 4, each link with a plurality of racks 5, the racks only on alternate links being in line (see Fig. 6.); the intermediate links having their racks in lines intermediate of the lines of the racks on the alternate links. This arrangement is to allow the links to pass around the rollers 2—3 and avoid interference of the teeth on one link with the teeth on an adjoining link; since the links are designed to lie close to one another and offer an unbroken surface when traversing the space between the rollers. The latter are circumferentially grooved as at 6 to accommodate the racks or teeth on the links; alternate grooves accommodating the teeth or racks on alternate links, and the intermediate grooves accommodating the teeth or racks on the other links. This gives plenty of room for the necessary hinge movement of any two adjacent links when going around a roller. The links are of any desired length corresponding to the desired width of the apron. Sufficient space is left between the racks of each link to allow for wear and to afford a good broad bearing surface for the apron on the rollers 2—3, whose grooves are of sufficient depth that the teeth will not touch the bottom of the grooves.

The apron is here shown as driven from the sprocketed or gear roller 7 arranged between the rollers 2—3 and between the planes of the apron. This gear roller has a plurality of gears 8 corresponding to the racks on the links of the apron. The gear roller is mounted on the shaft 9 and is adapted to engage both the down-going and up-going planes of racks on the inside of the apron.

Removably secured to each link of the apron is a block 11; each block having a tongue portion 12 fitting a corresponding dove-tailed groove in a link, the grooves running crosswise of the apron so that the blocks may be inserted or removed from the side of the apron. These blocks are channeled transversely and in the direction of travel of the apron to receive the removable sections 13 which have the impaling teeth or points 13′. The distance between the teeth of any one section and between the adjacent teeth of the parallel sections is less than the diameter of the seeds of the fruit undergoing treatment.

The plates 13 are removably held in the blocks 11 by suitable means, as the pins 14 passing lengthwise through perforations in the blocks and through the sections. Appropriately arranged to one side of this impaling apron is the endless conveyer belt 15 passing around the pulleys 16, which latter are suitably journaled in frame A, so as to be independently adjustable to accommodate the belt 15 to the impaling mechanism, as wear of any of the several parts may take place. As here shown the rollers 16 are supported in the adjustable boxes 17, having suitable take-up means as indicated at 18.

The belt 15 is preferably of soft resilient material, such as rubber, and is so arranged and positioned, that the fruit to be seeded is delivered upon a horizontal plane portion and fed gradually into a hopper-like space 19 between a vertical plane of impaling teeth and a nearly vertical plane of the carrier 15.

Any suitable form of spreader or distributer may be employed to retard the feed of the fruit from the top of the conveyer into the hopper space 19. I have here shown a rotary spreader 20 having a series of radial arms fixed to the hub of the shaft 21; the shaft being driven by connections as 22 from the drive-shaft 23 of a roller 16, so that the spreader 20 and the belt 15 travel in opposite directions. The hopper space 19 gradually converges toward the bottom, where the points of the impaling teeth are normal or approximately so to the surface of the belt 15. The width, however of this hopper space even at its widest point, preferably does not much exceed the thickness of a raisin or other fruit to be seeded, since it is the design of the machine to receive the fruit almost immediately between the teeth and the elastic surface of belt 15, as the fruit is delivered in a thin layer from the distributer 20. The fruit is gradually pressed onto the teeth as the adjacent planes of the two carriers descend and approach each other, resulting in the seeds being ejected from the pulp and pushed outward onto the elastic surface of the belt 15.

The apron which carries the impaling points, or, as I term it, the impaling apron and the belt 15 are driven so that the adjacent convergent planes of the impaling apron and belt 15 travel in the same direction and at the same rate of speed. For this purpose, the shaft 23 is shown as provided at one end with a sprocket 24; a chain 25 engages this sprocket and passes over a sprocket 26 on shaft 9 of the drive-roller 7 and around an adjustable idle sprocket 27.

The vertical portion of the belt 15 whereon the seeding of the fruit takes place, is supported between two adjacent rollers by an adjustable block 28. Similarly the opposed plane of the impaling and seeding apron is supported in opposition to the belt 15 by means of the grooved plate 29; the latter being suitably cut out to permit of the proper engagement of the gears on the drive-rollers 7 with the racks on the down-going plane of the impaling apron. The length and shape of the teeth or impaling points are such that the pulp portion of the fruit will be received into the interdental spaces and into the spaces between parallel sections 13, and the seeds will be ejected entirely outside of the pulp body; those seeds which do not adhere to the belt 15 being removed by an adjustable and removable scraper 30 arranged below the belt 15. This scraper is adapted not only to catch the seeds which remain on the ends of the impaling points, but is provided with a suitable vertical abrading or file surface 31, by which the points of the teeth may be kept from getting too sharp. By constant use the teeth have a tendency to become so sharp as to fail to properly eject the seeds. Hence it is that I provide the abrading surface 31 which can be adjusted relative to the impaling points and operate to keep them properly blunted; the part 30 thus serving a double function of a scraper for the seeds and a file for the teeth. The scraper and file device 30 is removably attached to a bar 32 which extends out through slots in the side of the frame A. The adjustment of the scraper and file relative to the abrading teeth is effected by loosening up the set screws 33 and inserting or removing one or more liners 34 as shown in Fig. 1. The seeds and gum which adhere to the belt are removed by a scraper 33′ whence they fall onto the deflector 34′ fastened onto and movable with the bar 32. The scraper 33′ is hinged at 33″ and provided with a counterbalance 33$^a$ so as to bear constantly and with proper pressure on the belt.

The impaling apron and the teeth are stripped of the fruit's pulp after passing beneath the scraper 30 by means of the combs 35 which are carried on the adjustable member 36. These combs consist of thin metal plates suitably pointed at their ends and fitting into the spaces between the teeth sections 13 and secured by appropriate means to the rockable member 36; the latter is connected with the bolts 37 which are adjusted by means of the set nuts 38 in the fixed guides 39 on the frame. By this construction the strippers 35 can be so adjusted that while they will operate to remove every particle of pulp between the rows of teeth, they need not bear with any frictional pressure on the carrier for the teeth; this is important, because it avoids the annoyance of wear and the necessity of frequent renewal where spring or other frictional stripping devices are used. The seeded fruit thus stripped free from the seeder is delivered to a suitable hopper space 40 in the bottom of the frame.

In order to cleanse the carrier 15 of any adhering pulp or gum, I provide a suitable moistened swab or sponge as shown at 30. The seeding apron is suitably incased and the front of this case is provided with a door 42 which may be turned upward on its hinges 43 to give access to the internal mechanism for the purpose of cleansing, or for any other reason. The top of this carrier casing at the sides may be provided with a removable plate 44 which will allow access to any of the links of the apron and permit a block 11 or any of the teeth sections to be removed or replaced.

The advantage of employing two straight inclined and opposed surfaces, such as represented by the impaling apron and the belt 15, is that it prevents the tearing of the raisins which occurs where saws on an impaling drum are used. By using two straight surfaces having the same rate of travel, and traveling in the same direction the penetration of the impaling points is in an almost direct line through the raisin, and the sawing action, such as happens in machines having the impaling teeth mounted on rollers, is avoided.

By having the rollers 16 adjustable the machine is adaptable to runs of different sizes and grades of raisins, since the hopper space 19 may be widened or narrowed as the case may require, by a suitable adjustment of the two upper rollers 16. Also the belt can be used until it is nearly worn out.

It is possible that various modifications in my invention may be made without departing from the principle thereof, and I do not wish to be understood as limiting myself to the specific construction as herein shown and described.

Having thus described my invention, what I claim and desire, to secure by Letters Patent is—

1. In a raisin seeder, the combination of an endless belt of soft elastic material, said belt passing around rollers and having a substantially horizontal feed portion and an approximately vertical seeding portion, an endless seeding apron having a vertical portion opposite to and coöperating with the vertical portion of said elastic belt, impaling teeth on said apron, a combined seed collector and abrader operating on said teeth, the vertical portion of said apron and the vertical portion of said elastic belt providing a convergent hopper-space into which the material to be seeded is delivered from the horizontal feed-portion of said belt, and means for varying the size of this hopper opening.

2. In a raisin seeder, the combination of an endless belt of soft elastic material, said belt passing around rollers and having a substantially horizontal feed portion and an approximately vertical seeding portion, an endless seeding apron having a vertical portion opposite to and coöperating with the vertical portion of said elastic belt, impaling teeth on said apron, the vertical portion of said apron and the vertical portion of said elastic belt providing a convergent hopper space into which the material to be seeded is delivered from the horizontal feed-portion of said belt, said impaling apron consisting of a series of pivotally connected slats having racks on their inner or undersides, grooved rollers supporting said apron, and means to operate the belt and apron so that their co-acting seeding surfaces travel in the same direction.

3. In a raisin seeder, the combination of an endless seeding apron comprising a series of pivotally connected slat members, said slat members having longitudinally extending grooves on their outer surfaces, blocks fitting said grooves, impaling teeth secured to said blocks, an endless carrier of soft elastic material arranged in juxtaposition with said impaling apron, and means to operate the apron and carrier so that their adjacent surfaces travel in the same direction.

4. In a raisin seeder, the combination of an endless seeding apron comprising a series of pivotally connected slat members, said slat members having longitudinally extending grooves on their outer surfaces, blocks fitting said grooves, impaling teeth secured to said blocks, an endless carrier of soft elastic material arranged in juxtaposition with said impaling apron, means to operate the apron and carrier so that their adjacent surfaces travel in the same direction, and a filing member with which said impaling points are adapted to contact for the purpose of maintaining the points of the impaling teeth flat.

5. In a seeding machine, the combination of an endless seeding apron comprising a series of pivotally conjoined slat-members, upper and lower rollers around which said apron passes, racks on the inner side of said slat-members, and a toothed roller arranged between said upper and lower supporting-rollers and engaging the down-going and up-going racks to drive the apron, impaling teeth on the apron, an elastic-traveling surface co-acting with said teeth to impale and seed the fruit, and an abrading tool arranged to contact with the teeth for blunting and flattening the points of the teeth.

6. In a seeding machine, the combination of two coöperating endless carriers, impaling points on one of said carriers, and a combined seed-collector and abrader engageable by said points.

7. In a seeding machine, an endless carrier provided with impaling points, means to impale the fruit on said points, and a single unitary means adjustable with relation to the impaling points for blunting or flattening the points of the teeth and shedding the extruded seeds.

8. In a seeding machine, the combination of two endless carriers, one of which is composed of elastic material, the other of which comprises a series of conjoined links provided with impaling teeth, said carriers arranged to provide a vertical hopper-space between them, and means for operating the carriers so that their adjacent surfaces travel in the same direction, and a combined seed collector and abrader operating on said teeth.

9. In a seeding machine, the combination of two endless carriers, one of which is composed of elastic material, the other of which comprises a series of conjoined links provided with impaling teeth, said carriers arranged to provide a vertical hopper-space between them, means for operating the carrier so that their adjacent surfaces travel in the same direction, and means for varying the size of said hopper space and a combined seed collector and abrader operating on said teeth.

In testimony whereof I have hereunto set my hand in presence of two subscribing witnesses.

GOTTHOLD L. LANGER.

Witnesses:
 CHAS. E. TOWNSEND,
 D. B. RICHARDS.